Patented Nov. 28, 1950

2,531,595

UNITED STATES PATENT OFFICE 2,531,595

PREPARATION OF ALPHA-ACYLAMINO-ALPHA-SUBSTITUTED-ACETIC ACIDS

Noel F. Albertson, East Greenbush, N. Y., assignor to Sterling Drug Inc., New York, N. Y., a corporation of Delaware No Drawing. Application June 9, 1949, Serial No. 98,163

5 Claims. (Cl. 260—534)

This invention relates to a process for the preparation of acylamino acids.

It is an object of my invention to provide a convenient method for hydrolyzing acylaminomalonic and -cyanoacetic esters to yield N-acyl derivatives of alpha-amino carboxylic acids which are useful in the resolution of racemic amino acids.

My invention comprises heating a (carboxylic acyl) amino-malonic or -cyanoacetic ester with an alkali metal carbonate in an aqueous medium, which treatment hydrolyzes and decarboxylates the starting ester to produce an alpha-(carboxylic acyl) amino carboxylic acid. My new process is generally applicable to the esters of a group of acids encompassed by the general structural formula

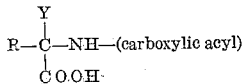

where Y is cyano or carboxyl and R is hydrogen or an organic radical. A broad variety of these acylaminomalonic and acylaminocyanoacetic ester starting materials is readily available since for a great many choices of the group R they are easily derived by known methods from malonic acid and cyanoacetic acid, respectively. Thus, the group R in the esters of the above-formulated acids can be an aliphatic, araliphatic, or aromatic radical, for example a hydrocarbon radical such as an alkyl, aralkyl, cycloalkyl, or aryl radical, or a hydrocarbon radical of this type substituted by hydroxyl, carbalkoxyl, alkoxyl, alkylthio, heteryl, etc. As specific examples of the group R, there are included: methyl, ethyl, n-propyl, isopropyl, n-butyl, isobutyl, sec.-butyl, allyl, methallyl, carbalkoxymethyl, 2-carbalkoxyethyl, 2-(methylthio)ethyl, phenyl, benzyl, 4-hydroxybenzyl, 3-indolemethyl, 4-imidazolemethyl, and 2-thenyl. Due to this wide range of available starting materials, my invention affords a convenient method for preparing N-(carboxylic acyl) derivatives of a large group of alpha-amino carboxylic acids including, for example, alanine, alpha-aminobutyric acid, valine, norvaline, leucine, norleucine, isoleucine, ornithine, lysine, aspartic acid (aminosuccinic acid), glutamic acid (alpha-aminoglutaric acid), methionine, phenylalanine, tyrosine, tryptophan, histidine, etc.

The present invention is particularly adapted to the preparation of N-acyl-alpha-amino carboxylic acids wherein the acyl group is a lower fatty acyl radical. By the term "lower fatty acyl," I mean to include acyl groups having 1-4 carbon atoms and which can be considered as being derived from a lower fatty acid, i. e. formic, acetic, propionic, and butyric acids, by removal of the —OH group from the carboxylic group of the acid. The members of this group of alpha-acylamino acids thus contain the characteristic structural grouping

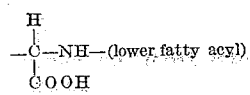

and includes, for example, N-acetylalanine, N-formylalanine, N-acetylnorleucine, N-propionylvaline, N-butyrylnorleucine, N-acetylvaline, 2-acetylamino-4-methyl-4-pentenoic acid, 2-acetylaminoheptanoic acid, N-acetylphenylalanine, alpha-acetylamino-(2-thiophene)acetic acid, N-acetylnorvaline, N-acetylnorleucine, 2-acetylaminodecanoic acid, N-acetyltryptophan, N-propionyltryptophan, N-acetylaspartic acid, N-propionylmethionine, N-acetyltyrosine, N-acetylhistidine, N-acetylglutamic acid, alpha-acetylamino-(2-furan)acetic acid, etc. For the preparation of these compounds, I prefer to employ, for purposes of convenience and economy, the lower alkyl esters of the acylamino-malonic or -cyanoacetic acids. By the term "lower alkyl," I mean to designate those branched and unbranched alkyl groups having about 1-7 carbon atoms, such as methyl, ethyl, n-propyl, isopropyl, n-hexyl, n-heptyl, etc. This preferred group of starting materials has the general structural formula

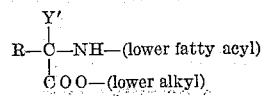

where Y' is cyano or lower carbalkoxyl (—COO— lower alkyl) and R has the aforementioned meaning.

The hydrolysis-decarboxylation reaction converts the starting ester to an acylamino acid according to the following equation:

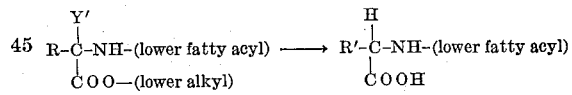

wherein the group R' is identical with the group R except in those particular instances, of course, where the group R contains a group susceptible to the mild reaction conditions of my process. For instance, when R contains a carbalkoxy or cyano group, these groups are hydrolyzed and appear as carboxyl groups in the group R' of the acylamino acid, as will be obvious from a consideration of the hydrolytic nature of the reaction medium. Ordinarily, however, the group R is not affected by the alkali metal carbonate, as for example when R is a hydrocarbon radical.

As a general practical procedure, I have found that the hydrolysis-decarboxylation of the (carboxylic acyl) amino-malonic or -cyanoacetic esters employed as starting materials can be carried out conveniently by refluxing the ester with a quantity of alkali metal carbonate, such as sodium carbonate or potassium carbonate, which is preferably, though not necessarily, in excess of the equivalent amount required by theory (conveniently, one part by weight of the carbonate per one part by weight of the ester) dissolved in about ten parts by weight of water. The reflux period was usually about twelve to sixteen hours for the malonic esters. The cyanoacetic esters were refluxed until evolution of ammonia had practically ceased, and the period of reflux was widely variable, but in general somewhat longer than the reflux period employed for the malonic esters. After completion of the reflux period, the reaction mixture was then cooled and acidified. The acidification, which can be effected by various conventional methods, such as adding hydrochloric acid to the mixture until it is acid to Congo red paper, frees the acylamino acid from its alkali metal salt. The acylamino acid frequently separates from the cooled reaction mixture at this point, although in some cases I have found that concentration of the solution and cooling is desirable in order to effect such separation in good yield. The acylamino acid was collected by filtration and recrystallized from water or aqueous alcohol. The compounds of lower molecular weight have a tendency to form supersaturated solutions and it has been found advantageous to obtain seed crystals of the acylamino acid from a small portion of the solution before acidifying all of the reaction mixture.

My invention is illustrated by the following examples without, however, being restricted thereto.

EXAMPLE 1

N-Acetylvaline

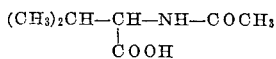

A mixture of 5 g. of ethyl isopropyl-acetamidomalonate, 5 g. of sodium carbonate, and 50 ml. of water was boiled under reflux for sixteen hours. The reaction mixture was then concentrated until crystals began to appear and was then acidified to Congo red paper with hydrochloric acid. The acidified mixture was seeded and the solid which separated was collected on a filter and washed with cold water until the filtrate was halogen-free. There was thus obtained as a product 2.2 g. of N-acetylvaline, which melted at 146° C.

EXAMPLE 2

2-acetylamino-4-methyl-4-pentenoic acid

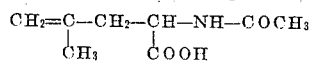

A mixture of 90 g. of ethyl methallyl-acetamido-malonate, 60 g. of sodium carbonate, and 600 ml. of water was refluxed for 16 hours. The reaction mixture was then concentrated until crystals began to appear and was then acidified to Congo red paper with hydrochloric acid. The solid which separated from the solution was collected on a filter and washed with water until the wash water was halogen-free. There was thus obtained 43 g. of 2-acetylamino-4-methyl-4-pentenoic acid, which melted at 157.9–160.0° C.

EXAMPLE 3

2-acetylaminoheptanoic acid

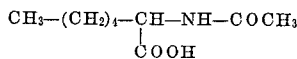

8 g. of ethyl (n-amyl)-acetamido-malonate was added to a solution of 8 g. of sodium carbonate in 80 ml. of water and the mixture was refluxed for 18 hours. The reaction mixture was then made acid to Congo red paper with hydrochloric acid and the acidified mixture was extracted with ether. The ether was evaporated from the ether extract, thus yielding a solid residue weighing 4 grams. This solid was recrystallized from water, thus yielding as a product 2-(acetylamino)heptanoic acid, which melted at 105–106° C.

EXAMPLE 4

N-acetylphenylalanine

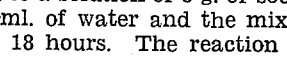

A mixture of 13 g. of ethyl benzyl-acetamidomalonate, 13 g. of potassium carbonate, and 130 ml. of water was refluxed for 21 hours. The reaction mixture was then cooled and washed with chloroform and the water layer was concentrated to one-half its original volume. This concentrated solution was made acid to Congo red by addition of hydrochloric acid, and the white solid which separated was collected on a filter. This solid, which was N-acetylphenylalanine, weighed 7.8 g. and melted at 152° C.

EXAMPLE 5

Alpha-acetylamino-(2-thenyl) acetic acid

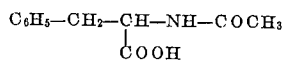

A mixture of 5 g. of ethyl thenyl-acetamidomalonate, 5 g. of sodium carbonate, and 50 ml. of water was refluxed for 7 hours. The reaction mixture was then concentrated almost to dryness and the residue was redissolved in 10 ml. of water. This solution was made acid to Congo red by addition of hydrochloric acid, whereupon there separated a viscous oil which soon solidified. This solid was washed with cold water. There was thus obtained 2.7 g. of alpha-acetylamino-(2-thenyl)acetic acid, M. P. 120–121° C. This product was recrystallized from 20 ml. of water after charcoaling the aqueous solution and there was thus obtained the purified acylamino acid, which melted at 121° C.

EXAMPLE 6

N-acetylnorvaline

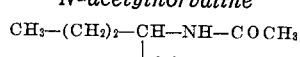

A mixture of 117 g. of ethyl (n-propyl)-acetamido-cyanoacetate, 75 g. of sodium carbonate, and 750 ml. of water was refluxed for 112 hours. The reaction mixture was then chilled and made acid to Congo red paper by addition of hydrochloric acid. The acidified solution was seeded and the solid which separated was collected on a filter and dried. There was thus obtained 60.4 g. of N-acetylnorvaline, M. P. 109–111° C.,

EXAMPLE 7

*N-acetylnorleucine*

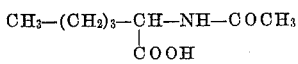

A mixture of 8.9 g. of ethyl (n-butyl)-acetamido-cyanoacetate, 8.9 g. of sodium carbonate, and 90 ml. of water was refluxed for 56 hours. The reaction mixture was then made acid to Congo red by addition of hydrochloric acid and the acidified solution was refrigerated overnight. There separated from the solution 0.6 g. of the amino acid norleucine, M. P. 270–274° C., which was collected on a filter. The filtrate was chilled further and there separated 2.8 g. of N-acetylnorleucine, which melted at 103–104° C.

EXAMPLE 8

*2-acetylaminodecanoic acid*

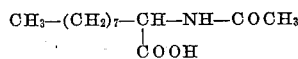

12 g. of ethyl (n-octyl)-acetamido-cyanoacetate, 12 g. of sodium carbonate, and 120 ml. of water was refluxed for 15 hours. The reaction mixture was then made acid to Congo red and the solid which separated from the solution was collected on a filter and washed with water until the wash water was halogen-free. There was thus obtained 9.5 g. of impure 2-(acetylamino)decanoic acid which when recrystallized twice from aqueous ethanol yielded 7 g. of the purified acylamino acid which melted at 105° C.

EXAMPLE 9

*Alpha-(N-acetyl)tryptophan*

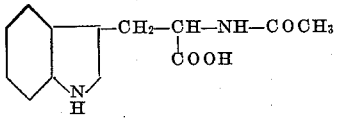

A mixture of 10 g. of ethyl (3-indolemethyl)-acetamido-cyanoacetate, 10 g. of sodium carbonate, and 100 ml. of water was refluxed for about sixty-two hours. The reaction mixture was then cooled and there was added to the solution with stirring 20 ml. of concentrated hydrochloric acid and 60 ml. of water. The solid which separated from the acidified solution was collected on a filter and washed with water. There was thus obtained 6.7 g. of alpha-(N-acetyl)tryptophan, which melted at 197–200° C.

EXAMPLE 10

*2-acetylamino-4-pentenoic acid*

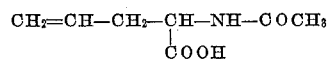

A mixture of 15.5 g. of ethyl allyl-acetamidomalonate, 15.5 g. of sodium carbonate, and 15.5 ml. of water was refluxed for sixteen hours. The reaction mixture was then cooled and acidified with hydrochloric acid. The product, 2-acetylamino-4-pentenoic acid, was not isolated as such but was converted to the butyl ester in the reaction mixture by treatment with an excess of butanol. The resulting butyl ester, which was contained in the excess of butyl alcohol, was separated from the aqueous portion of the reaction mixture, dried with sodium sulfate, filtered, and distilled, thus yielding 9.0 g. of n-butyl 2-acetylamino-4-pentenoate, which boiled at 118° C. at 1.1 mm.

EXAMPLE 11

*N-Formylalanine*

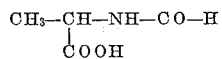

When ethyl methyl-formylamino-malonate is heated with aqueous sodium carbonate in a manner similar to that described in Example 4, there is obtained as the reaction product N-formylalanine, which melts at 147–148° C.

In the above examples, when there are employed, instead of the ethyl ester starting materials, the corresponding methyl or isobutyl esters, the same acylamino acid is obtained as the product in each case respectively. In similar fashion, potassium carbonate can be substituted for the sodium carbonate in the above examples to give the same acylamino acid products in similar yields.

I claim:

1. The process for preparing an alpha-(lower fatty acyl)amino carboxylic acid which comprises heating a lower alkyl ester of an acid selected from the group consisting of (lower fatty acyl)amino-malonic acids and (lower fatty acyl)amino-cyanoacetic acids with an alkali metal carbonate in an aqueous medium.

2. The process for preparing an alpha-(lower fatty acyl)amino carboxylic acid which comprises heating a (lower fatty acyl)aminomalonic ester having the formula

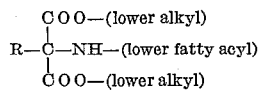

where R is a hydrocarbon radical, with an alkali metal carbonate in an aqueous medium.

3. The process for preparing an alpha-acetylamino carboxylic acid which comprises heating a lower alkyl ester of an acetylaminomalonic acid with an alkali metal carbonate in an aqueous medium.

4. The process for preparing an alpha-acetylamino carboxylic acid which comprises heating an acetylamino-malonic ester having the formula

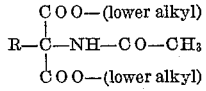

where R is a hydrocarbon radical, with an alkali metal carbonate in an aqueous medium.

5. The process for preparing an alpha-acetylamino carboxylic acid which comprises heating the ethyl ester of an acetylaminomalonic acid with sodium carbonate in an aqueous medium.

NOEL F. ALBERTSON.

REFERENCES CITED

The following references are of record in the file of this patent:

UNITED STATES PATENTS

| Number | Name | Date |
|---|---|---|
| 2,447,545 | Snyder et al. | Aug. 24, 1948 |
| 2,478,788 | Snyder et al. | Aug. 9, 1949 |
| 2,479,662 | Albertson et al. | Aug. 23, 1949 |

OTHER REFERENCES

Redemann et al., J. Biol. Chem., vol. 130, pages 341–348 (1939).

Albertson, J. Am. Chem. Soc., vol. 68, pages 450–453 (1946).

Albertson et al., J. Am. Chem. Soc., vol. 70, pages 1150–1152 (March 1948).